United States Patent
Boscolo Berto et al.

(10) Patent No.: US 9,917,540 B2
(45) Date of Patent: Mar. 13, 2018

(54) MUTUAL INDUCTANCE VOLTAGE OFFSET COMPENSATION FOR BRUSHLESS DC SENSORLESS MOTORS

(71) Applicant: STMicroelectronics S.r.l., Agrate Brianza (IT)

(72) Inventors: Michele Boscolo Berto, Sesto San Giovanni (IT); Siro Vittoni, San Giorgio Su Legnano (IT)

(73) Assignee: STMICROELECTRICS S.R.L., Agrate Brianza (IT)

( * ) Notice: Subject to any disclaimer, the term of this patent is extended or adjusted under 35 U.S.C. 154(b) by 58 days.

(21) Appl. No.: 14/937,248

(22) Filed: Nov. 10, 2015

(65) Prior Publication Data

US 2017/0133962 A1    May 11, 2017

(51) Int. Cl.

| | |
|---|---|
| *H02P 6/14* | (2016.01) |
| *H02P 6/18* | (2016.01) |
| *H02P 6/182* | (2016.01) |
| *H02P 6/185* | (2016.01) |
| *H02P 6/15* | (2016.01) |
| *H02K 1/34* | (2006.01) |
| *H02K 3/04* | (2006.01) |

(52) U.S. Cl.
CPC ............. *H02P 6/182* (2013.01); *H02P 6/157* (2016.02); *H02P 6/185* (2013.01)

(58) Field of Classification Search
CPC .... H02P 6/18; H02P 23/00; H02P 6/00; H02P 6/14
See application file for complete search history.

(56) References Cited

U.S. PATENT DOCUMENTS

| | | | | | |
|---|---|---|---|---|---|
| 5,789,895 | A * | 8/1998 | Lee | ......... | H02P 6/182 318/400.34 |
| 6,555,977 | B1 * | 4/2003 | Du | ......... | H02P 6/18 310/184 |
| 6,633,145 | B2 * | 10/2003 | Shao | ......... | H02P 6/085 318/400.35 |
| 8,040,095 | B2 * | 10/2011 | Berto | ......... | H02P 6/182 318/400.13 |

(Continued)

*Primary Examiner* — Eduardo Colon Santana
*Assistant Examiner* — Said Bouziane
(74) *Attorney, Agent, or Firm* — Gardere Wynne Sewell LLP

(57) ABSTRACT

A control circuit controls the operation of a brushless DC (BLDC) sensorless motor having a first terminal connected to a first winding, a second terminal connected to a second winding and a third terminal connected to a third winding. A driver circuit applies drive signals to the first and second terminals and places the third terminal in a high-impedance state. The drive signals include first drive signals at a first current amplitude and second drive signals at a second current amplitude different from the first current amplitude. A differencing circuit senses a first mutual inductance voltage at the third terminal in response to the first drive signals and senses a second mutual inductance voltage at the third terminal in response to the second drive signals. The differencing circuit further determines a difference between the first and second mutual inductance voltages and produces a difference signal that is used for zero-crossing detection and rotor position sensing.

33 Claims, 12 Drawing Sheets

(56) References Cited

U.S. PATENT DOCUMENTS

| | | | |
|---|---|---|---|
| 8,994,306 B2* | 3/2015 | Kobayashi | H02P 6/183 318/400.13 |
| 2008/0238349 A1* | 10/2008 | Cheng | H02P 6/16 318/400.05 |
| 2010/0001673 A1* | 1/2010 | Cardoletti | H02P 6/18 318/400.34 |
| 2012/0146626 A1* | 6/2012 | Bieler | H02P 6/182 324/207.16 |
| 2013/0221885 A1* | 8/2013 | Hunter | H02P 21/0003 318/400.15 |
| 2015/0295526 A1* | 10/2015 | Chew | H02P 6/186 318/400.33 |
| 2017/0229989 A1* | 8/2017 | Marcinkiewicz | H02P 21/22 |

* cited by examiner

MUTUAL INDUCTANCE VOLTAGE OFFSET COMPENSATION FOR BRUSHLESS DC SENSORLESS MOTORS

TECHNICAL FIELD

The present disclosure generally relates to a motor control circuit and, more particularly, to a motor control circuit that compensates for the mutual inductance voltage offset present in some brushless DC (BLDC) sensorless motors.

BACKGROUND

Reference is now made to FIG. 1 showing a prior art control circuit 10 for a brushless DC (BLDC) sensorless motor 12.

The motor 12 includes three motor windings represented by inductances La, Lb and Lc. Each motor winding is coupled between a center terminal CT of the motor 12 and one of the external drive terminals A, B, C of the motor. For example, the winding La is coupled between CT and terminal A, the winding Lb is coupled between CT and terminal B. and the winding Lc is coupled between CT and terminal C. The motor 12 may further support a fourth external terminal that is connected to the center terminal CT.

The control circuit 10 includes a driver circuit 14 that operates to generate drive signals (Out A, Out B and Out C) for application to the external drive terminals A, B, C of the motor. The driver circuit 14 operates in response to control signals 16 generated by a logic circuit 18 (which may be implemented in an embodiment using a programmed microcontroller or microprocessor). In the case of the three phases of the motor 12, the logic circuit 18 controls the driver circuit 14 to drive the terminals of the motor with a "six-step" technique wherein the windings are cyclically powered. The six steps may, for example, comprise: CB; AB; AC; BC; BA; and CA, wherein the first letter x in the letter pair xy identifies the motor terminal connected by the driver circuit 14 to a higher voltage and the second letter y identifies the motor terminal connected by the driver circuit 14 to a lower voltage. It will be noted that for each step there is a winding of the motor 12 which is not driven (this being typically accomplished by having the associated terminal of the motor placed by the driver circuit in a high-impedance or tri-state state).

If the BLDC motor 12 is running at a relative high speed, the voltage across the undriven winding arises mainly due to the counter back-electromotive force (BEMF) that is a function of the motor speed. If the motor 12 is instead stopped or running at a very low speed, the voltage across the undriven winding arises instead mainly due to the mutual inductance (MI) phenomena if the driver circuit generates variable current (for example, the driver is working in a switching mode). The variable current flowing through the driven winding generates variable magnetic flux. The variable magnetic flux is concatenated to the undriven winding (thanks to the mutual inductance) and generates a voltage across the undriven winding itself (this being referred to in the art as the "mutual inductance" voltage). Because the mutual inductance is function of the rotor position, the voltage generated across the undriven coil (the mutual inductance voltage) will also be a function of the rotor position and its variability is used to detect the rotor position.

Using a multiplexor (MUX) circuit 20, the undriven motor terminal at each step of the drive cycle is selectively connected to a first input of a comparator circuit 22. The logic circuit 18 uses selection signal S to control the switching selection made by the multiplexor circuit 20 to choose the terminal for the undriven winding. A second input of the comparator 22 is connected to a reference node 26, with that reference node being connected in an embodiment to the fourth external terminal of the motor 12 that is connected to the center terminal CT. In event the connection to the center terminal CT is not available, a virtual center terminal can be created using resistors 24 that are coupled between the reference node 26 and each of the drive terminals for the signals Out A, Out B and Out C at the output of the driver circuit 14.

The comparator 22 functions as a zero-crossing (ZC) detection circuit to detect instances where the voltage on the first input (i.e., the voltage on the undriven motor terminal) crosses over the voltage of the reference node 26. The zero-crossing detection signal 28 output from the comparator 22 is applied to the logic circuit 18 for use, for example, in detecting the physical rotational position of the motor 12 using techniques well known to those skilled in the art. Knowledge of the rotor position is important in order to properly generate the sequence of signals in the pair xy for application to the motor terminals for driving motor operation.

In the case where the motor 12 is running at a relative high speed, the voltage across the undriven winding is usually high enough for the comparator 22 to make a reliable zero-cross detection. However, in the case where the motor 12 is instead stopped or running at a very low speed, the magnitude of the variable voltage across the undriven winding can be very low (for example, tenths of millivolts). An accurate zero-crossing detection may be difficult due to the presence of a mutual inductance (MI) voltage offset. Any error in the center tap reconstruction using resistors 24 (for example, due to resistive mismatch) or any motor construction unbalance (for example, due to coil asymmetry), can introduce an unwanted voltage offset in the voltage across the undriven winding. FIG. 2 shows an ideal example of the MI voltage sensed on the undriven motor terminal for motor 12 as well as the locations where the comparator 22 can make an accurate zero-crossing detection. FIG. 3, however, shows the effect of the mutual inductance voltage offset 30 on the voltage across the undriven winding which shifts the position of the zero-crossing detection (referred to as a zero-cross position error) relative to the ideal case of FIG. 2. The mutual inductance voltage offset can make the mutual inductance zero-crossing (MIZC) detection unreliable, and in a worst case scenario the MIZC detection is not guaranteed at all. In either case, detection of rotor position is compromised.

There is a need in art to account for the mutual inductance voltage offset in order to make an accurate MIZC detection.

SUMMARY

In an embodiment, a control circuit is provided for controlling the operation of a brushless DC (BLDC) sensorless motor having a first terminal connected to a first winding, a second terminal connected to a second winding and a third terminal connected to a third winding. The control circuit comprises: a driver circuit configured to apply drive signals to the first and second terminals and place the third terminal in a high-impedance state; wherein the drive signals generated by the driver circuit include first drive signals at a first current amplitude and a second drive signals at a second current amplitude different from the first current amplitude; and a differencing circuit configured to sense a first mutual inductance voltage at the third terminal in response to the first drive signals and sense a second mutual inductance voltage at the third terminal in response to the second drive signals, said differencing circuit further configured to determine a difference between the first and second mutual inductance voltages and produce a difference signal.

In an embodiment, a control circuit for controlling operation of a brushless DC (BLDC) sensorless motor having a first terminal connected to a first winding, a second terminal connected to a second winding and a third terminal connected to a third winding comprises: a drive control circuit configured to control the generation of drive signals to the first and second terminals and place the third terminal in a high-impedance state; wherein the drive signals include first drive signals at a first current amplitude and second drive signals at a second current amplitude different from the first current amplitude; and a differencing circuit configured to sense a first mutual inductance voltage at the third terminal in response to the first drive signals and sense a second mutual inductance voltage at the third terminal in response to the second drive signals, said differencing circuit further configured to determine a difference between the first and second mutual inductance voltages and produce a difference signal.

In an embodiment, a control circuit for controlling operation of a brushless DC (BLDC) sensorless motor having a first terminal connected to a first winding, a second terminal connected to a second winding and a third terminal connected to a third winding comprises: a logic circuit configured to control the generation of drive signals for application to the first and second terminals and place the third terminal in a high-impedance state, wherein the drive signals include first drive signals at a first current amplitude and second drive signals at a second current amplitude different from the first current amplitude; an analog-to-digital converter configured to sense a first mutual inductance voltage at the third terminal in response to the first drive signals to generate a first digital signal and sense a second mutual inductance voltage at the third terminal in response to the second drive signals to generate a second digital signal; said logic circuit further configured to determine a difference between the first and second digital signals and produce a difference signal indicative of a difference between the first and second mutual inductance voltages.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
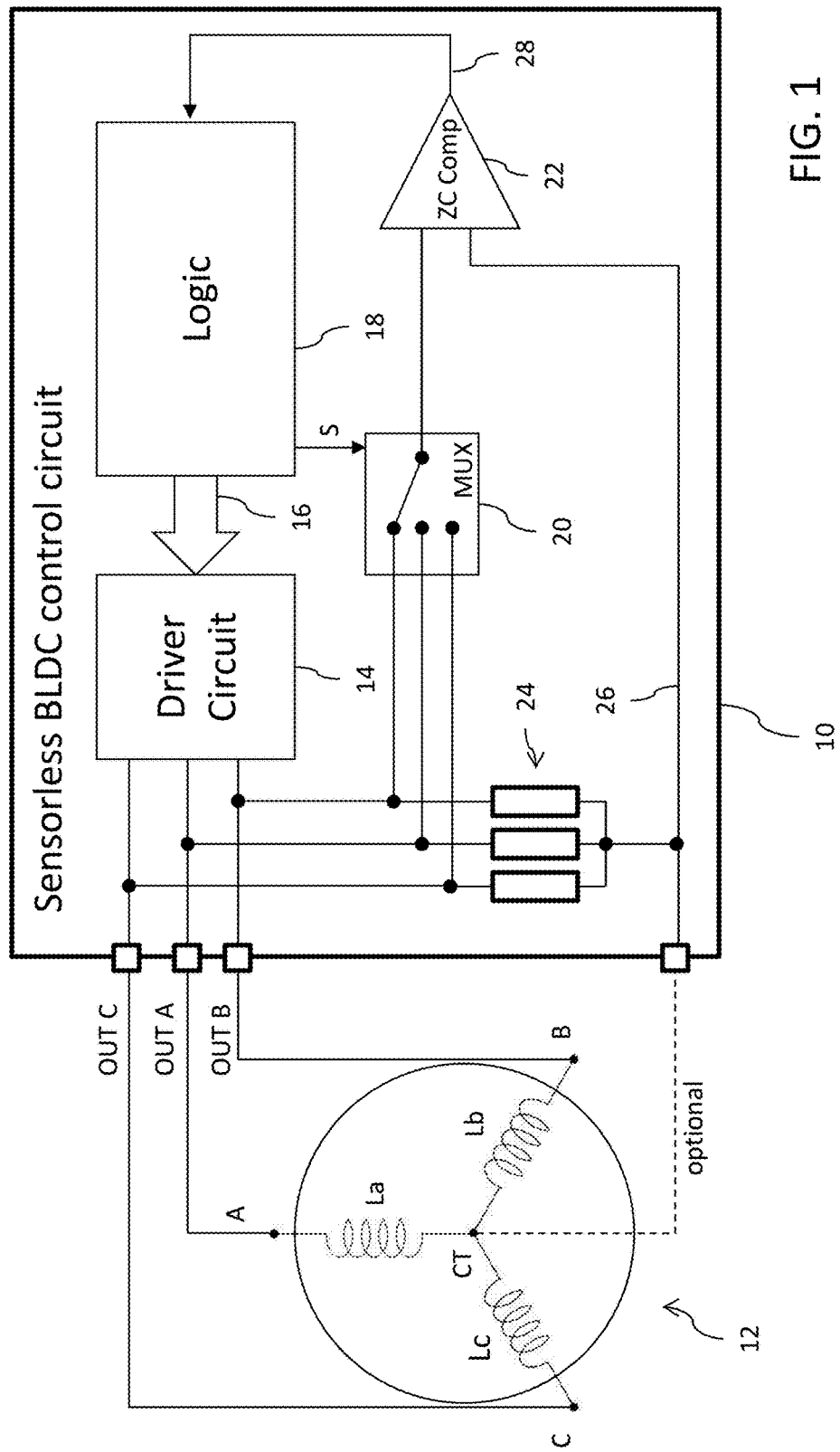
FIG. 1 shows a prior art control circuit for a brushless DC (BLDC) sensorless motor.

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the circuits powered by the power converter have not been detailed, the described embodiments being compatible with usual applications. In the following description, when reference is made to terms "about", "approximately", or "in the order of", this means to within 10%, preferably to within 5%.

Figure 4:
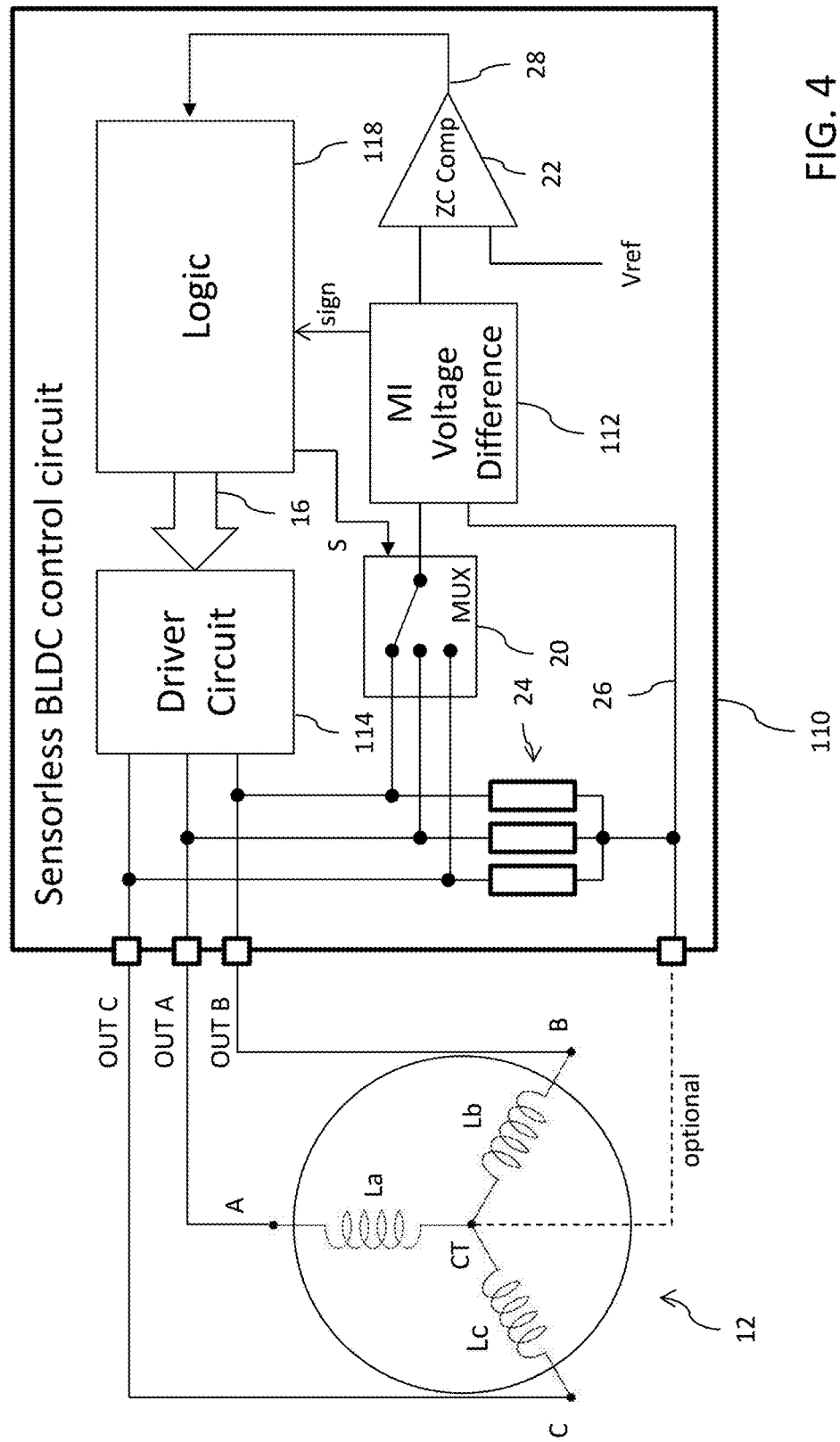
FIG. 4 shows a control circuit for a BLDC sensorless motor with mutual inductance voltage offset compensation.

Reference is now made to FIG. 4 showing a control circuit 110 for a BLDC sensorless motor 12 with mutual inductance voltage offset compensation. Like reference numbers refer to like or similar components or features in FIG. 1 as previously described herein. The driver 110 of FIG. 4 differs from the driver 10 of FIG. 1 mainly with respect to the inclusion of a mutual inductance (MI) voltage difference detection circuit 112 and provision with respect to the logic circuit 118 and driver circuit 114 to drive the motor 12 with different current amplitudes. The logic circuit 118 includes a drive control circuit for generating drive control signals applied to control operation of the driver circuit 114. In FIG. 4, the MI voltage difference detection circuit 112 includes a first input coupled to the output of the MUX circuit 20 and a second input coupled to the reference node 26. The comparator 22 has a first input coupled to an output of the MI voltage difference detection circuit 112 and a second input coupled to receive a reference voltage Vref.

The control circuit 110 may be implemented as an integrated circuit comprising one or more chips in a single package. It will further be understood that the driver circuit 114 may be implemented "off-chip" using discrete transistor devices in half-bridge circuit configurations as known in the art. The circuitry of MUX circuit 20, MI voltage difference detection circuit 112 and comparator 22 may be implemented as mixed analog/digital domain circuits on one or more chips. In certain embodiments, as much of the signal processing as possible is preferably implemented in the digital domain. Appropriate analog-to-digital converter and digital-to-analog converter circuitry would be provided to convert the signals between the analog/digital domains.

Figure 5:
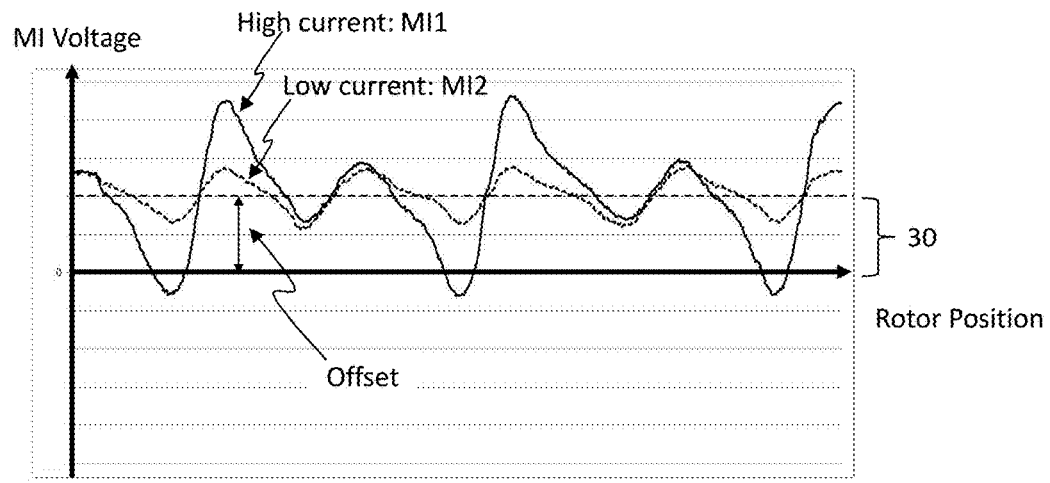
FIG. 5 shows the effect of the mutual inductance voltage offset on the voltage across the undriven winding for two different current amplitudes.

FIG. 5 shows the effect of the mutual inductance voltage offset on the voltage across the undriven winding for two different current amplitudes (referenced as a "high" current (MI1) and a "low" current (MI2) to indicate their relative magnitudes or maximum amplitudes) in driving operation of the motor. It will be noted that the mutual inductance voltage across the undriven winding of the motor 12 has a modulation amplitude that is a function of the magnitude of the current flowing through the two driven windings of the motor. Additionally, it will be noted that the mutual inductance voltage offset 30 on the voltage across the undriven winding is independent of the magnitude of the current flowing through the two driven windings of the motor. The logic circuit 118 and driver circuit 114 function in FIG. 4 to drive the motor 12 with different current amplitudes (high and low, for example), while the mutual inductance (MI) voltage difference detection circuit 112 functions to determine the difference between the mutual inductance voltages for the two different currents.

Figure 5A:
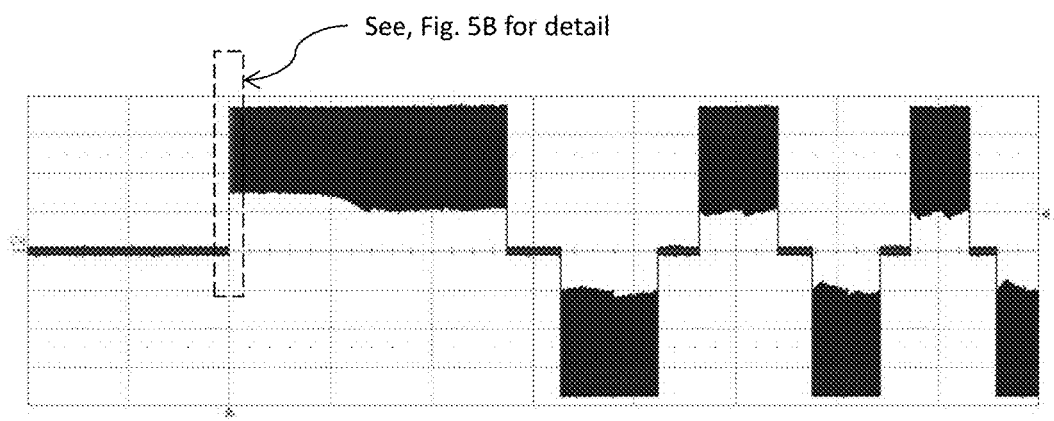
FIGS. 5A and 5B illustrate winding current with two different magnitudes.
Figure 5B:
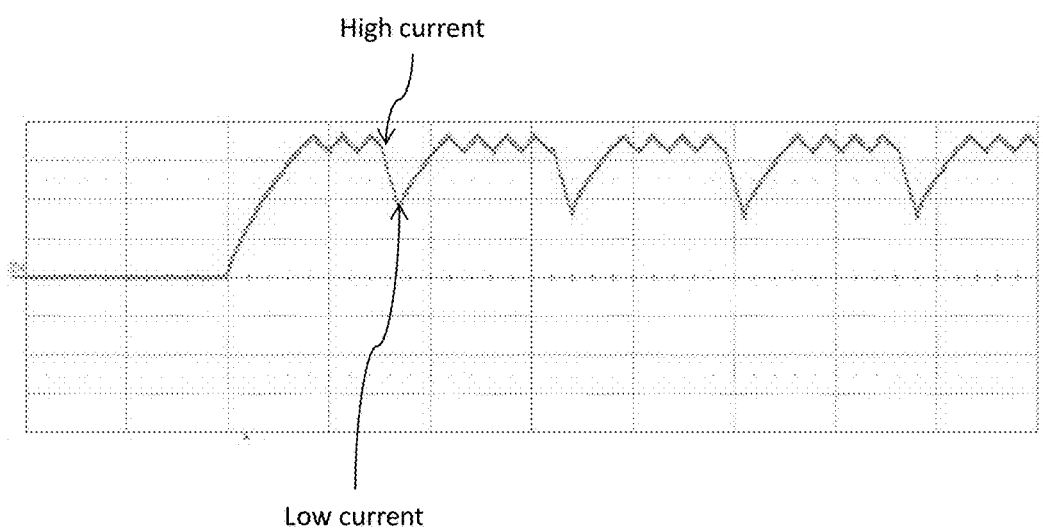

FIG. 5A shows the applied winding current. FIG. 5B shows detail of the applied winding current to more explicitly show that the winding current includes a relative higher magnitude current and a relatively lower magnitude current that is applied to the winding. The different current amplitudes (high and low) are obtained by forcing a current decay (for example, acting on the current limiter circuit) for a certain time. In FIG. 5B, the high current point and the low current point generate two different mutual inductance voltages (MI1 and MI2), respectively.

Figure 2:
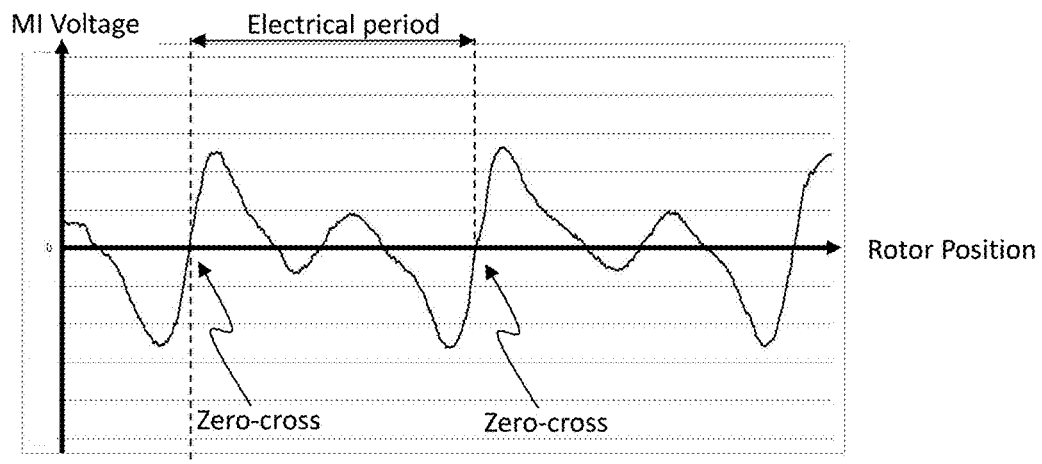
FIG. 2 shows an ideal example of a mutual inductance voltage on an undriven winding of a motor.
Figure 3:
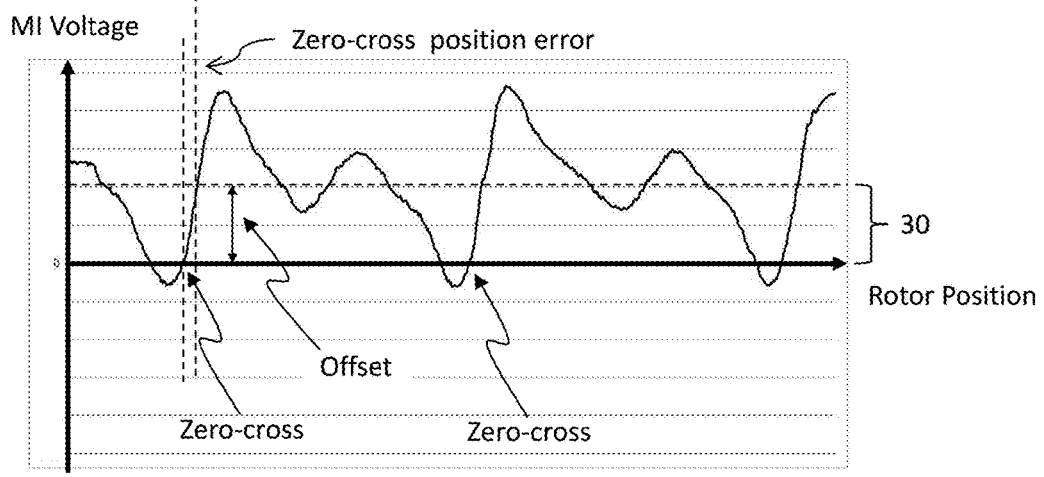
FIG. 3 shows the effect of a mutual inductance voltage offset on the mutual inductance voltage across the undriven winding of the motor.
Figure 6:
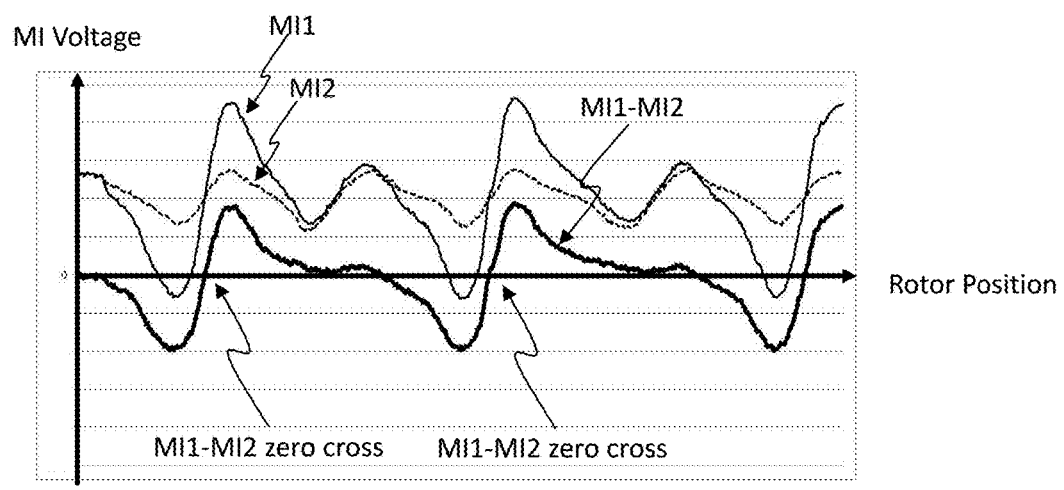
FIG. 6 shows the result of determining the difference between the mutual inductance voltages for the two different currents.

FIG. 6 shows the result of determining the difference between the mutual inductance voltages for the two different currents. The mutual inductance voltage offset 30, which is shared in common at a same magnitude for each of the mutual inductance voltages MI1 and MI2 at the two different currents, is canceled by the differencing operation performed by the mutual inductance (MI) voltage difference detection circuit 112. The result of the differencing operation is shown by waveform MI1-MI2 which is applied to the first input of the comparator circuit 22 for comparison against the reference voltage Vref (which comprises, for example, a null voltage). The signal at the output of the MI voltage difference detection circuit 112 (i.e, MI1-MI2) is a "sign" signal that is either positive or negative, and the null reference voltage is used for the sign comparison. The comparator circuit 22 functions as the zero-crossing detector to generate the zero-crossing detection signal 28. Notably, the detected zero-cross positions are, in the case of the waveform MI1-MI2, accurate since the zero-cross position error has been compensated by the operation of the mutual inductance (MI) voltage difference detection circuit 112 (compare to ideal case of FIG. 2).

It will further be noted that the zero-crossing event coincides with instances wherein the MI1 and MI2 waveforms cross over each other. In other words, the zero-crossing event coincides with instances where the mathematical difference between MI1 and MI2 changes sign. This sign change can be detected by the voltage difference detection circuit 112 and output as the zero-crossing signal. Examples of implementations of the described operation are presented below.

It will be understood that the illustration of the MI voltage difference detection circuit 112 and comparator circuit 22 as separate from the logic circuit is by example only. Indeed, the functionalities performed by these circuits may be implemented within the logic circuit itself if desired. Indeed, much of the signal processing operations could be performed in a microprocessor or microcontroller circuit which implements all or part of the logic circuit 118, the MI voltage difference detection circuit 112 and comparator circuit 22. Appropriate analog-to-digital converter and digital-to-analog converter circuitry would be provided to convert the signals between the analog/digital domains.

The functionality of the mutual inductance (MI) voltage difference detection circuit 112 can be implemented in a number of ways using either analog or digital circuitry.

Figure 7:
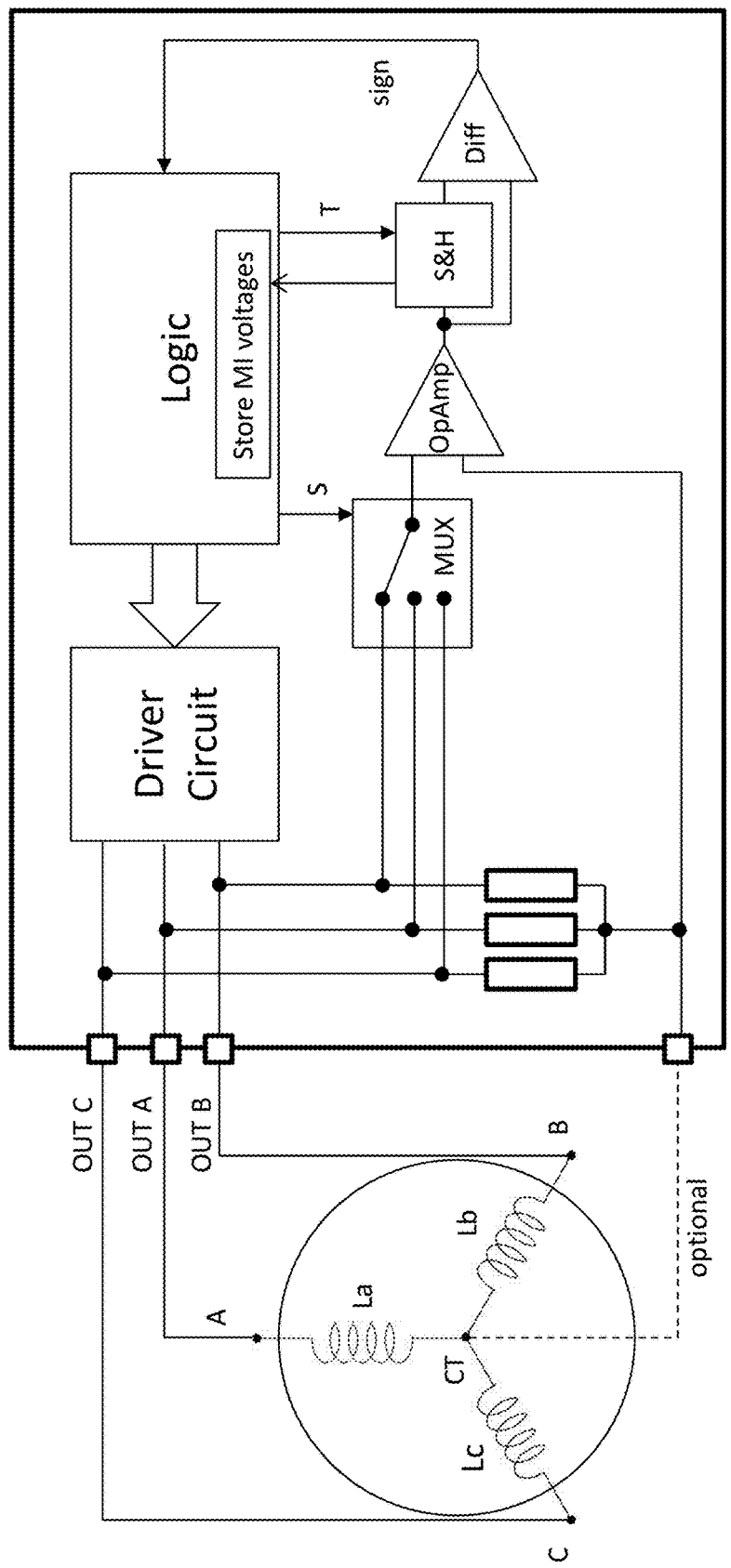
FIG. 7 illustrates details of an analog implementation of FIG. 4.

An example of an analog circuit implementation is shown in FIG. 7. The MI1 voltage is sampled and stored using the sample and hold (S&H) circuit and is compared with the voltage MI2 using a differencing circuit (Diff) after a certain time. Of course, the voltage MI1 and the voltage MI2 on the undriven winding must be generated using two different driven winding current amplitudes, and this is effectuated through the operation of the logic circuit and driver circuit as discussed above. The voltages MI1 and MI2 are the analog voltages across the undriven winding as output by the operational amplifier (OpAmp) with reference to the voltage at the reference node 26. When the output of the comparator changes state, this is indicative of a change in sign with respect to the difference between the voltage MI1 and the voltage MI2 provides information regarding the MI zero-cross detection. In this implementation the logic circuit not only provides the control signal S for selecting the undriven terminal through the MUX, but also provides a control T for timing the sample and hold function to capture either the voltage MI1 and the voltage MI2.

Figure 8:
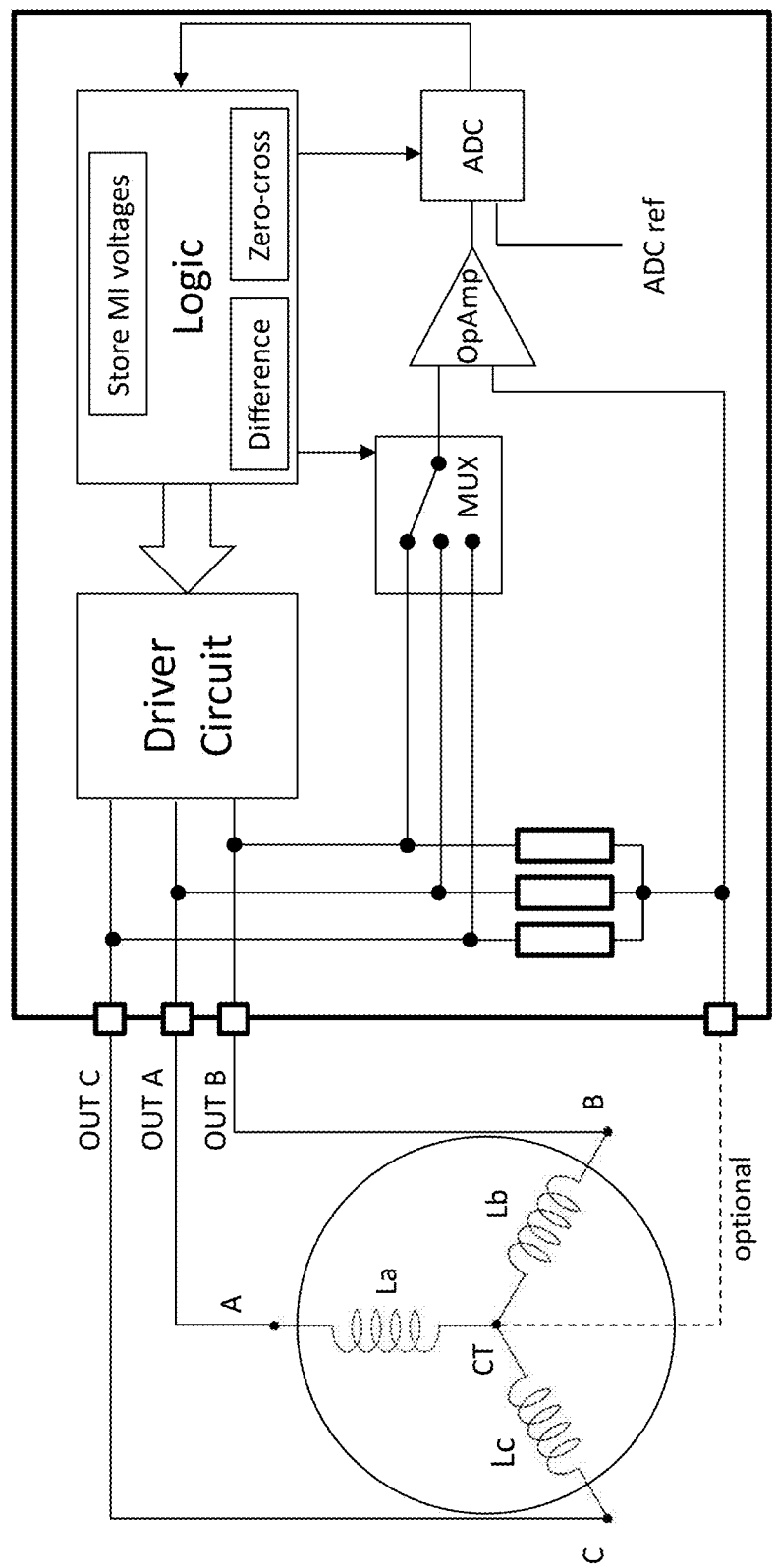
FIGS. 8-10 illustrate details of digital implementations of FIG. 4.

An example of a digital circuit implementation is shown in FIG. 8. In this circuit the MI1 voltage is measured using the OpAmp and the analog to digital converter (ADC) circuit. The MI2 voltage is also measured using the OpAmp and the ADC circuit at a different time. The ADC circuit further receives a fixed ADC reference voltage (for example, a ground voltage), and because of this the OpAmp is included to reconstruct the differential voltage across the winding. Of course, the voltage MI1 and the voltage MI2 on the undriven winding must be generated using two different driven winding current amplitudes, and this is effectuated through the operation of the logic circuit and driver circuit as discussed above. The digital values for the MI1 and MI2 voltages are supplied to the logic circuit which implements the difference determination and performs the zero-crossing detection. So, the MI1-MI2 determination is a numeric computation done inside the logic block.

Figure 9:
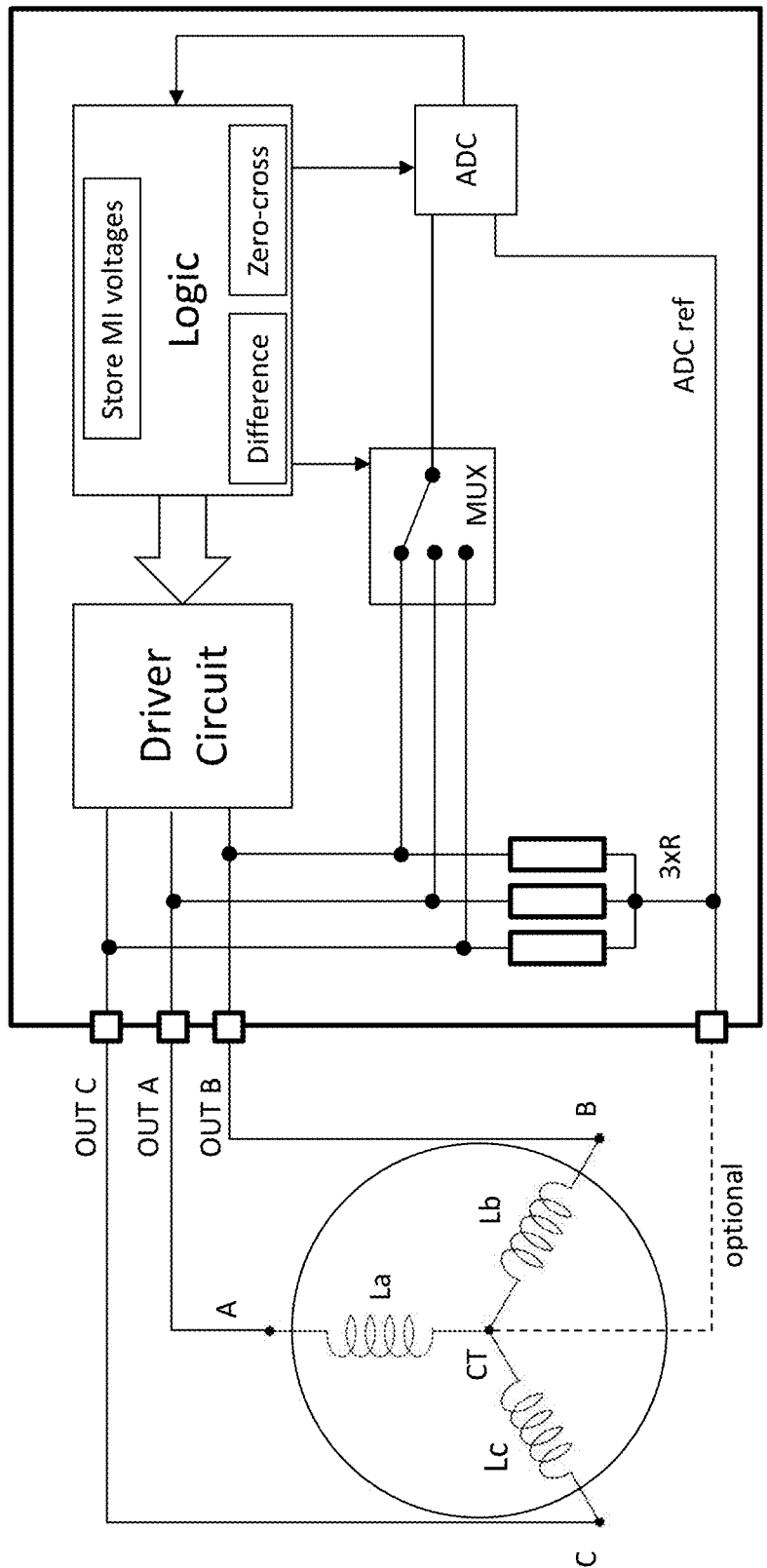

A further example of a digital circuit implementation is shown in FIG. 9. In this circuit the differential voltage across the winding (mutual inductance voltage MI1 and MI2) is obtained by properly using the reference of the analog to digital converter (ADC) circuit. The use of the center tap voltage as the ADC reference voltage allows for reconstruction of the differential voltage across the undriven winding without using the OpAmp circuit, thus reducing the cost of the application. Thus, the numeric voltage at the output of the ADC for application to the logic circuit is the differential voltage between the undriven coil tap and the center tap obtained with a single ADC conversion. Of course, the voltage MI1 and the voltage MI2 on the undriven winding must be generated using two different driven winding current amplitudes, and this is effectuated through the operation of the logic circuit and driver circuit as discussed above. This circuit does not use the OpAmp circuit as shown in FIG. 8.

Figure 10:
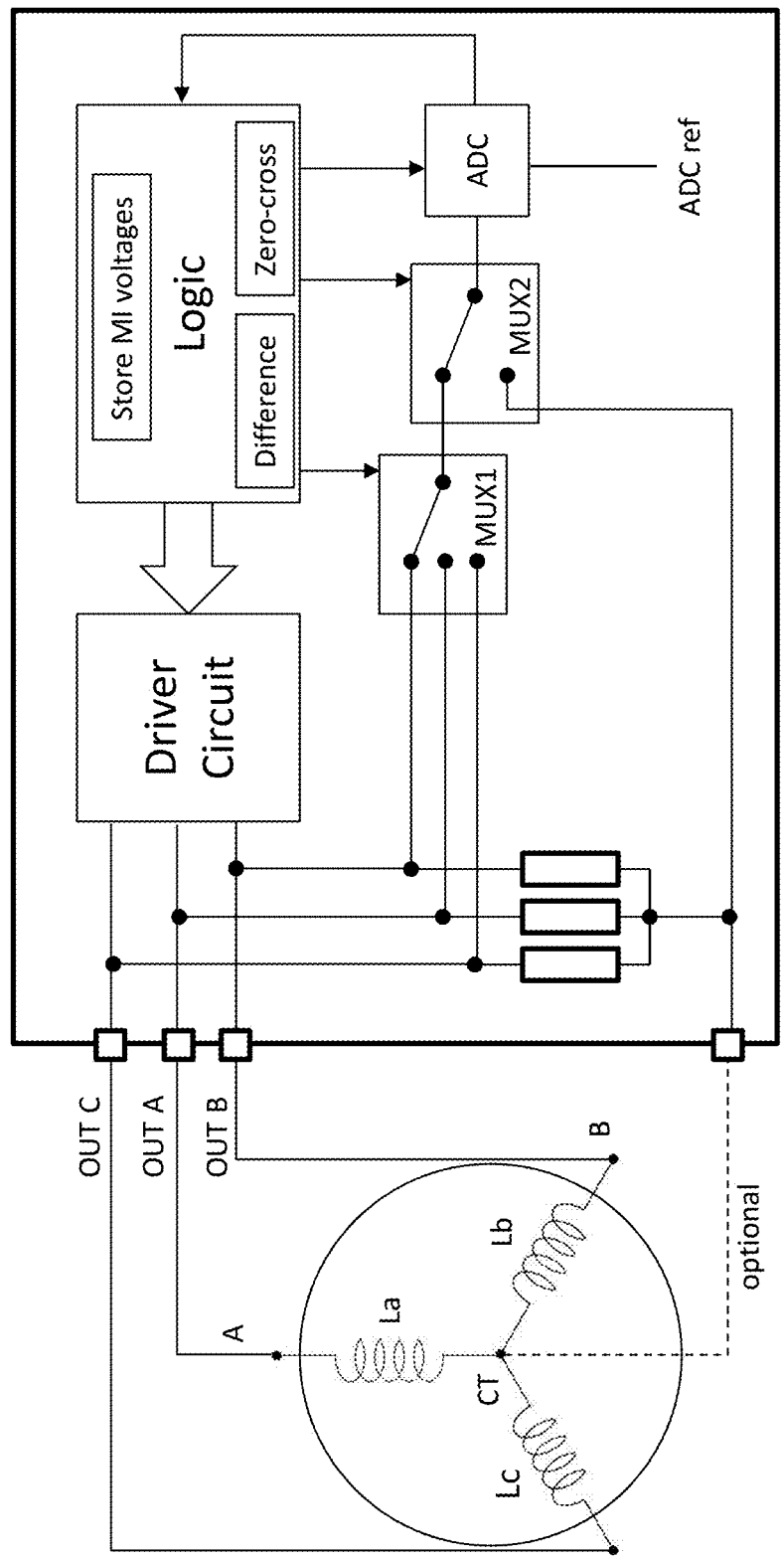

Another example of a digital circuit implementation is shown in FIG. 10. In this circuit, the voltage difference on the undriven winding is obtained by a numeric difference. Each MI voltage (MI1 and MI2) is then obtained by two analog to digital converter (ADC) conversion operations performed in fast sequence where the first ADC conversion is applied to the tap of the undriven coil selected by MUX1, and the second conversion is applied to the center tap voltage selected by MUX2. Of course, the voltage MI1 and the voltage MI2 on the undriven winding must be generated using two different driven winding current amplitudes, and this is effectuated through the operation of the logic circuit and driver circuit as discussed above. The digital values for the MI1 and MI2 voltages are supplied to the logic circuit which implements the difference determination and performs the zero-crossing detection. So, the MI1-MI2 determination is a numeric computation done inside the logic block. The ADC circuit further receives a fixed ADC reference voltage (for example, a ground voltage).

The foregoing advantageously permits cancellation of the mutual inductance voltage offset without the necessity of actually measuring the mutual inductance voltage offset.

Figure 11A:
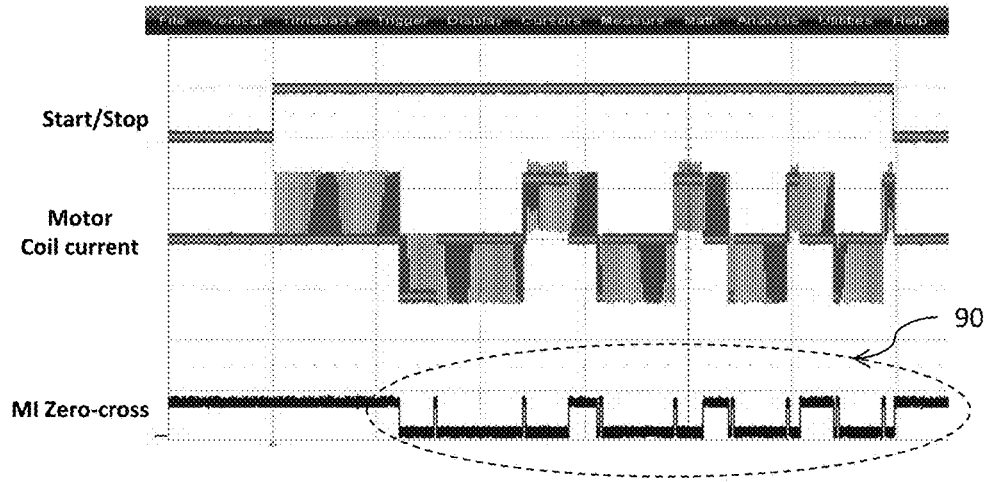
FIGS. 11A and 12A show waveforms for a start-up procedure of the implementation of FIG. 1.
Figure 11B:
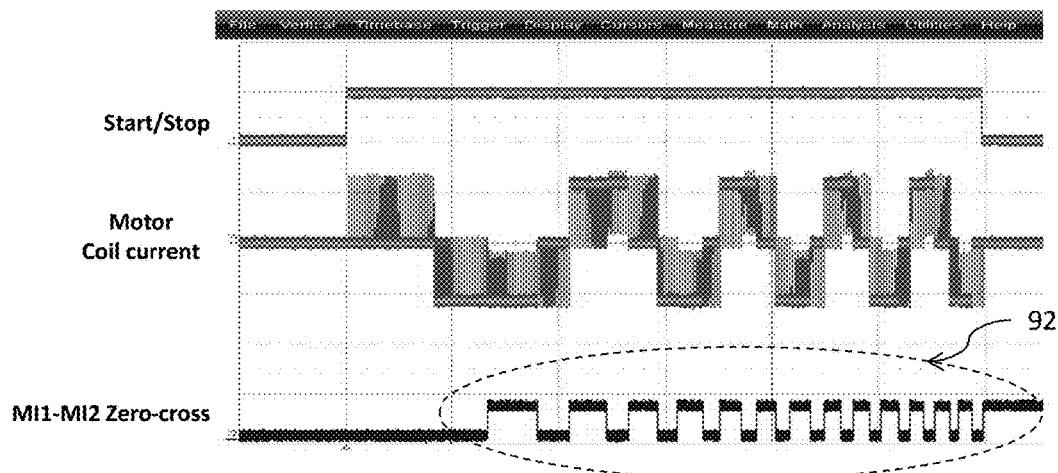
FIGS. 11B and 12B show waveforms for a start-up procedure of the implementation of FIG. 4.

FIGS. 11A and 11B show waveforms for start-up procedures, with FIG. 11A showing operation of the prior art circuit 10 of FIG. 1 and FIG. 11B showing operation of the circuit 110 of FIG. 4. FIG. 11A illustrates the mutual inductance zero-cross (MIZC) signal as being affected by imprecise (spurious) commutations 90 (due to the mutual inductance voltage offset). FIG. 11B, on the other hand, illustrates that the difference determination for the MI1-MI2 zero-cross signal is instead without any imprecise commutations 92 (because the mutual inductance voltage offset has been compensated).

Figure 12A:
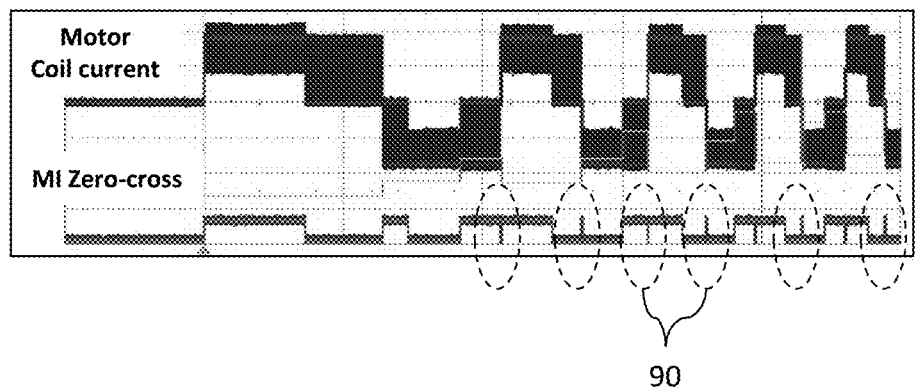
Figure 12B:
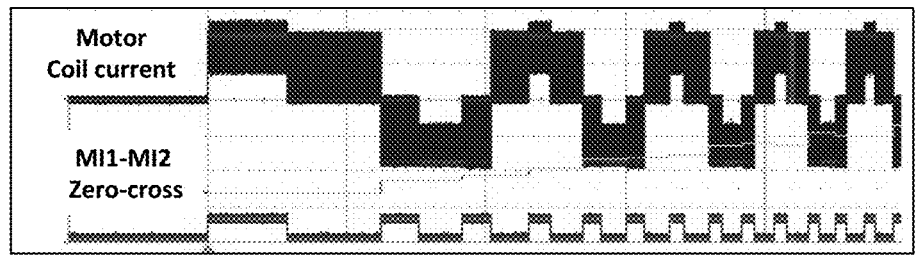

FIGS. 12A and 12B likewise show waveforms for start-up procedures, with FIG. 12A showing operation of the prior art circuit 10 of FIG. 1 and FIG. 12B showing operation of the circuit 110 of FIG. 4. FIG. 12A shows in more detail the imprecise (spurious) commutations 90 present in the mutual inductance zero-cross (MIZC) signal due to the offset. FIG. 12B, on the other hand, shows that the spurious commutations are not present in the difference MI1-M12 zero-cross signal.

The foregoing describe how to cancel the effect of the mutual inductance voltage offset without the necessity to directly measure the offset amplitude itself (the offset is automatically cancelled by the MI1-MI2 computation).

The mutual inductance voltage offset measurement is anyway possible thanks to the following characteristic: The MI voltage offset is equal to the MI1 and/or MI2 voltage value measured in the MI1-MI2 Zero cross position (see, FIG. 5). Thanks to the above characteristic, it is possible to measure the voltage offset during the motor driving commutations based on the MI1-MI2 zero cross. In other words, any time the MI1-MI2 zero cross is detected, the MI1 (or MI2) value is stored (in a memory, for example, see FIGS. 7-10 storing MI value at zero cross). The stored value corresponds to the mutual inductance voltage offset and can be used as described herein.

The knowledge of the mutual inductance offset value allows for use of a mutual inductance zero cross detection by the logic circuitry without the necessity of the double mutual inductance voltage measurement (MI1 and MI2) and computation of the difference (MI1-MI2). This allows further advantages on the BLDC driving technique.

Knowing the offset value it is possible to use a single mutual inductance voltage (MI1, for example) in a further operational mode to detect the mutual inductance voltage zero cross, in other words it is not required for two different current amplitudes to be used to generate MI1 and MI2 with an advantage in terms of current ripple. The logic circuit thus need only control the driver circuit to generate a single current amplitude and the mutual inductance voltage in response to that current amplitude is obtained (and perhaps stored if needed) for comparison against the previously stored value associated with the zero cross detection.

Knowing the voltage offset, the zero cross is simply obtained by comparing the MI1 voltage with the offset (MI1-Offset).

FIG. 5A shows the current ripple generated by the high current and low current conditions (required for MI1 and MI2 generation). Knowing the voltage offset, however, means that the two different current amplitudes are no longer necessary. The current ripple can then be minimized with advantages in term of average current and acoustic noise generation. The driver can accordingly operate with only the higher (or lower) drive amplitude and the ripple associated with use of both current amplitudes is obviated.

Figure 13A:
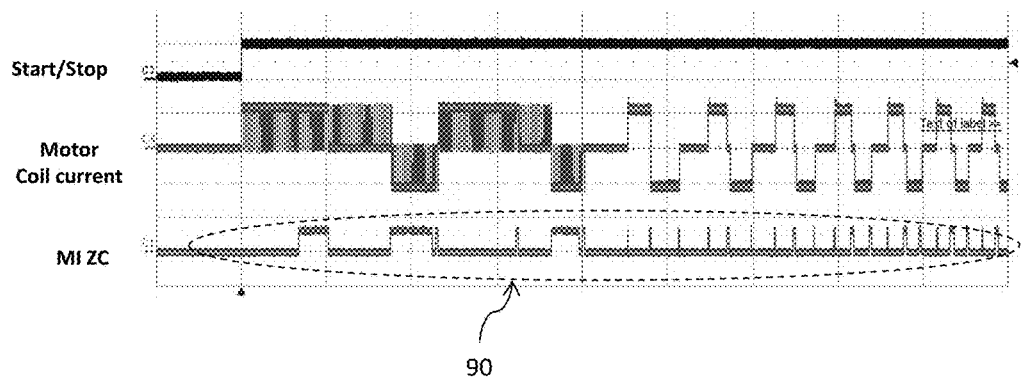
FIG. 13A illustrates prior art operation.
Figure 13B:
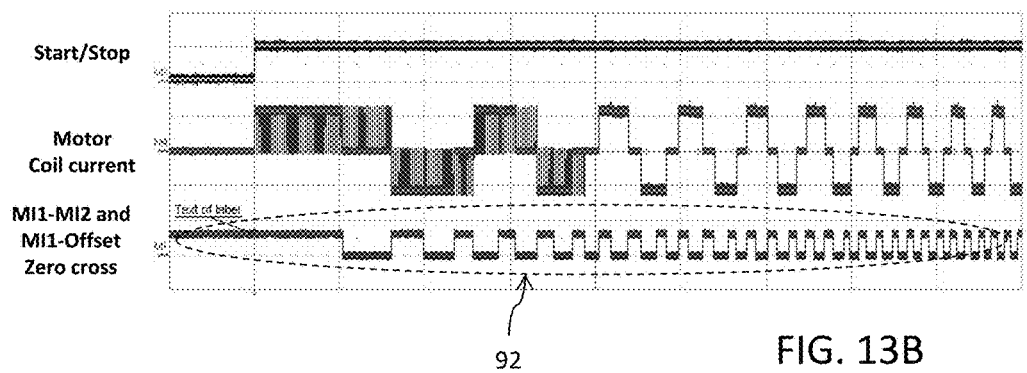
FIG. 13B is a waveform for operation with respect to a single drive current amplitude for zero-crossing detection.

An example of mutual inductance voltage offset measure (during the first driver commutations) and the usage of the voltage offset is shown in FIG. 13B. FIG. 13A shows the BLDC startup procedure based on the MI1 zero cross (as in the prior art) with imprecise (spurious) commutations 90 while FIG. 13B shows the startup instead based on the MI1-Offset zero cross without any imprecise commutations 92. FIG. 13A further shows performance using a prior art method based on the undriven winding differential voltage zero cross, such as in the prior art method showed in FIG. 1.

In FIG. 13B, it is evident how the embodiments herein are able to guarantee a very accurate zero cross detection in comparison to the prior art method. It is also evident the advantage of the offset measurement to minimize the current ripple for a minimum time.

Various embodiments have been described. Various alterations, modifications, and improvements will readily occur to those skilled in the art. Further, the practical implementation of the embodiments which have been described is within the abilities of those skilled in the art based on the functional indications given hereabove.

The invention claimed is:

1. A control circuit for controlling operation of a brushless DC (BLDC) sensorless motor having a first terminal connected to a first winding, a second terminal connected to a second winding and a third terminal connected to a third winding, comprising:
   a drive control circuit configured to control the generation of drive signals for controlling application of pulses of a drive current through the motor between the first and second terminals and place the third terminal in a high-impedance state;
   wherein each pulse of the drive current is applied to include a first portion of said pulse with a first current magnitude and a second portion of said pulse with a second current magnitude different from the first current magnitude;
   a differencing circuit configured to sense within each pulse a first mutual inductance voltage at the third terminal in response to the first portion of said pulse of drive current at the first current magnitude and a second mutual inductance voltage at the third terminal in response to the second portion of said pulse of drive current at the second current magnitude, said differencing circuit further configured to determine a difference between the first and second mutual inductance voltages and produce a difference signal; and
   a zero-crossing detection circuit configured to receive the difference signal and detect a zero-crossing condition of the difference signal that is indicative of a position of the rotor.

2. The control circuit of claim 1, further comprising a driver circuit responsive to drive signals generated by the drive control circuit, said driver circuit having outputs coupled to the first, second and third terminals of the BLDC sensorless motor.

3. The control circuit of claim 2, further comprising a multiplexing circuit configured to select the third terminal for connection to the differencing circuit when the driver circuit applies the drive current through the motor between the first and second terminals.

4. The control circuit of claim 1, wherein the drive control circuit comprises a logic circuit configured to process the detected zero-crossing condition and determine the position of the rotor.

5. The control circuit of claim 1, wherein the zero-crossing detection circuit comprises a comparator circuit having a first input configured to receive the difference signal and a second input configured to receive a null reference signal.

6. The control circuit of claim 5, wherein the motor further comprises a center tap for windings of the motor, and said difference circuit receives a voltage at said center tap.

7. The control circuit of claim 5, further comprising a virtual center tap circuit configured to provide a virtual center tap of the motor to said difference circuit.

8. The control circuit of claim 1, further comprising a circuit configured to store the first mutual inductance voltage at the third terminal in response to the detected zero-crossing condition, said drive control circuit further operable in a mode to control application of the drive current only at the first current magnitude and the zero-crossing detection circuit is configured in said mode to detect a zero-crossing condition by comparing a sensed first mutual inductance voltage at the third terminal in response to the drive current at the first current magnitude to said stored first mutual inductance voltage.

9. The control circuit of claim 1, further comprising a circuit configured to store the second mutual inductance voltage at the third terminal in response to the detected zero-crossing condition, said drive control circuit further operable in a mode to control application of the drive current only at the second current magnitude and the zero-crossing detection circuit is configured in said mode to detect a zero-crossing condition by comparing a sensed second mutual inductance voltage at the third terminal in response to the drive current at the second current magnitude to said stored second mutual inductance voltage.

10. The control circuit of claim 1, wherein a change in sign of said difference signal indicates occurrence of a zero-crossing event.

11. The control circuit of claim 10, wherein the drive control circuit comprises a logic circuit configured to process the zero-crossing event and determine a position of the rotor.

12. The control circuit of claim 1, wherein the differencing circuit comprises:
   an amplifier circuit configured to sense the first and second mutual inductance voltages;
   a sample and hold circuit coupled to an output of the amplifier circuit to save one of the first and second mutual inductance voltages; and
   a comparator circuit having a first input coupled to an output of the sample and hold circuit to receive the saved one of the first and second mutual inductance voltages and a second input coupled to an output of the amplifier circuit to receive the another one of the first and second mutual inductance voltages.

13. The control circuit of claim 12, wherein said amplifier circuit has a first input coupled to the third terminal and a second input coupled to receive a reference signal; and
   wherein the motor further comprises a center tap for windings of the motor, said reference signal comprising a voltage at the center tap.

14. The control circuit of claim 12,
   wherein said amplifier circuit has a first input coupled to the third terminal and a second input coupled to receive a reference signal; and
   further comprising a virtual center tap circuit configured to provide a virtual center tap of the motor, said reference signal comprising a voltage at the virtual center tap.

15. The control circuit of claim 1, wherein the differencing circuit comprises:
   an amplifier circuit configured to sense the first and second mutual inductance voltages;
   an analog to digital converter circuit having an input coupled to an output of the amplifier circuit, said analog to digital converter circuit configured to convert the sensed first and second mutual inductance voltages to digital values; and
   wherein said drive control circuit comprises a logic circuit configured to process the digital values to produce the difference signal.

16. The control circuit of claim 15,
   wherein said amplifier circuit has a first input coupled to the third terminal and a second input coupled to receive a reference signal; and
   wherein the motor further comprises a center tap for windings of the motor, said reference signal comprising a voltage at the center tap.

17. The control circuit of claim 15, wherein said amplifier circuit has a first input coupled to the third terminal and a second input coupled to receive a reference signal; and
   further comprising a virtual center tap circuit configured to provide a virtual center tap of the motor, said reference signal comprising a voltage at the virtual center tap.

18. The control circuit of claim 1, wherein the differencing circuit comprises:
   an analog to digital converter circuit having a first input coupled to the third terminal and a second input coupled to a reference signal, said analog to digital converter circuit configured to convert the voltages at the third terminal and reference signal to digital values; and
   wherein the drive control circuit comprises a logic circuit configured to process the digital values to produce the difference signal.

19. The control circuit of claim 18, wherein the motor further comprises a center tap for windings of the motor, said reference signal comprising a voltage at the center tap.

20. The control circuit of claim 18, further comprising a virtual center tap circuit configured to provide a virtual center tap of the motor, said reference signal comprising a voltage at the virtual center tap.

21. The control circuit of claim 1, wherein the differencing circuit comprises:
   a multiplexing circuit having a first input coupled to said third terminal and a second input coupled to a reference signal;
   an analog to digital converter circuit having an input coupled to an output of the multiplexing circuit, said analog to digital converter circuit configured to convert the voltages at the third terminal and the reference signal to digital values; and wherein the drive control circuit comprises a logic circuit configured to process the digital values to produce the difference signal.

22. The control circuit of claim 21, wherein the motor further comprises a center tap for windings of the motor, said reference signal comprising a voltage at the center tap.

23. The control circuit of claim 21, further comprising a virtual center tap circuit configured to provide a virtual center tap of the motor, said reference signal comprising a voltage at the virtual center tap.

24. A control circuit for controlling operation of a brushless DC (BLDC) sensorless motor having a first terminal connected to a first winding, a second terminal connected to a second winding and a third terminal connected to a third winding, comprising:

a logic circuit configured to control the generation of drive signals for application for controlling application of pulses of a drive current through the motor between the first and second terminals and place the third terminal in a high-impedance state, wherein each pulse of the drive current is applied with a first portion of said pulse at a first current magnitude and a second portion of said pulse at a second current magnitude different from the first current magnitude;

an analog-to-digital converter configured to sense within each pulse a first mutual inductance voltage at the third terminal in response to the drive current in said first portion of the pulse at the first current magnitude to generate a first digital signal and a second mutual inductance voltage at the third terminal in response to the drive current in said second portion of the pulse at the second current magnitude to generate a second digital signal;

said logic circuit further configured to determine a difference between the first and second digital signals and produce a difference signal indicative of a difference between the first and second mutual inductance voltages; and a zero-crossing detection circuit configured to receive the difference signal and detect a zero-crossing condition of the difference signal that is indicative of rotor position.

25. The control circuit of claim 24, further comprising a driver circuit responsive to drive signals generated by the logic circuit, said driver circuit having outputs coupled to the first, second and third terminals of the BLDC sensorless motor.

26. The control circuit of claim 24, further comprising a circuit configured to process the detected zero-crossing condition of the difference signal and determine the position of the rotor.

27. The control circuit of claim 26, further comprising a circuit configured to store the first mutual inductance voltage at the third terminal in response to the detected zero-crossing condition, said logic circuit further operable in a mode to control application of the drive current only at the first current magnitude and the zero-crossing detection circuit is configured in said mode to detect a zero-crossing condition by comparing a sensed first mutual inductance voltage at the third terminal in response to the drive current at the first current magnitude to said stored first mutual inductance voltage.

28. The control circuit of claim 24, further comprising an operational amplifier having a first input coupled to the third terminal and a second input coupled to a reference signal, wherein an output of the operational amplifier is connected to an input of the analog-to-digital converter.

29. The control circuit of claim 28, wherein the motor further comprises a center tap for windings of the motor, said reference signal comprising a voltage at the center tap.

30. The control circuit of claim 28, further comprising a virtual center tap circuit configured to provide a virtual center tap of the motor, said reference signal comprising a voltage at the virtual center tap.

31. The control circuit of claim 24, further comprising a multiplexing circuit having a first input coupled to said third terminal and a second input coupled to a reference signal, wherein an output of the multiplexer is connected to an input of the analog-to-digital converter.

32. The control circuit of claim 31, wherein the motor further comprises a center tap for windings of the motor, said reference signal comprising a voltage at the center tap.

33. The control circuit of claim 32, further comprising a virtual center tap circuit configured to provide a virtual center tap of the motor, said reference signal comprising a voltage at the virtual center tap.

* * * * *

UNITED STATES PATENT AND TRADEMARK OFFICE
CERTIFICATE OF CORRECTION

PATENT NO. : 9,917,540 B2
APPLICATION NO. : 14/937248
DATED : March 13, 2018
INVENTOR(S) : Michele Boscolo Berto et al.

It is certified that error appears in the above-identified patent and that said Letters Patent is hereby corrected as shown below:

In the Specification

At Column 6, Line number 39, please replace the term [[MI1-M12]] with the term -- MI1-MI2 --.

At Column 7, Line number 33, please replace the term [[MI1-M12]] with the term -- MI1-MI2 --.

Signed and Sealed this
Tenth Day of July, 2018

Andrei Iancu
*Director of the United States Patent and Trademark Office*